(12) United States Patent
Komada et al.

(10) Patent No.: US 11,385,135 B2
(45) Date of Patent: Jul. 12, 2022

(54) VEHICLE TEST DEVICE, VEHICLE TEST METHOD AND PROGRAM FOR VEHICLE TEST DEVICE

(71) Applicant: HORIBA, Ltd., Kyoto (JP)

(72) Inventors: Mineyuki Komada, Kyoto (JP); Kazuhiro Shiomi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 343 days.

(21) Appl. No.: 15/313,704

(22) PCT Filed: Feb. 22, 2016

(86) PCT No.: PCT/JP2016/055060
§ 371 (c)(1),
(2) Date: Nov. 23, 2016

(87) PCT Pub. No.: WO2016/143492
PCT Pub. Date: Sep. 15, 2016

(65) Prior Publication Data
US 2017/0191902 A1      Jul. 6, 2017

(30) Foreign Application Priority Data
Mar. 6, 2015  (JP) .............................. JP2015-044809

(51) Int. Cl.
*G01M 17/007* (2006.01)
*G01L 25/00* (2006.01)

(52) U.S. Cl.
CPC ....... *G01M 17/0072* (2013.01); *G01L 25/003* (2013.01); *G01M 17/007* (2013.01); *G01M 17/0074* (2013.01)

(58) Field of Classification Search
CPC ................................................. G01M 17/0072
See application file for complete search history.

(56) References Cited

U.S. PATENT DOCUMENTS 4,848,142 A * 7/1989 Fujimori ........... G01M 17/0072
                                                        73/116.06
5,375,461 A * 12/1994 Suzuki .............. G01M 17/0072
                                                        73/116.06
(Continued)

FOREIGN PATENT DOCUMENTS

| CN | 2476468 Y | 2/2002 |
| CN | 1397789 A | 2/2003 |

(Continued)

OTHER PUBLICATIONS

International Search Report for Application No. PCT/JP2016/055060, dated Apr. 26, 2016, 3 pgs.

(Continued)

*Primary Examiner* — Raymond L Nimox
(74) *Attorney, Agent, or Firm* — Brooks Kushman P.C.

(57) ABSTRACT

A vehicle test device is to test performance of a vehicle or a part of the vehicle by rotating a wheel placed on a rotating body in order to reproduce an actually running state of the vehicle by controlling rotational speed of the wheel so as to make the rotational speed equal to a target value accurately, and a rotation related value that indicates rotational speed of the wheel or torque applied to the wheel is obtained, and the rotational speed of the rotating body or the torque applied to the rotating body is controlled so as to make the rotation related value equal to a predetermined target value.

6 Claims, 5 Drawing Sheets

(56) References Cited

U.S. PATENT DOCUMENTS

| | | | | |
|---|---|---|---|---|
| 6,247,348 B1* | 6/2001 | Yamakado | ........ | G01M 17/045 |
| | | | | 73/11.04 |
| 6,257,054 B1* | 7/2001 | Rostkowski | ............ | G01L 3/22 |
| | | | | 73/116.08 |
| 2009/0049901 A1* | 2/2009 | Fukamachi | .......... | B60T 8/1706 |
| | | | | 73/121 |
| 2009/0319200 A1* | 12/2009 | Satonaka | ......... | G01M 17/0072 |
| | | | | 702/41 |
| 2012/0131994 A1* | 5/2012 | Ben-David | ....... | G01M 17/0074 |
| | | | | 73/116.01 |

FOREIGN PATENT DOCUMENTS

| | | | |
|---|---|---|---|
| JP | 54-033401 A | 3/1979 | |
| JP | 58-001139 U | 1/1983 | |
| JP | 60-047939 A | 3/1985 | |
| JP | 05-340846 A | 12/1993 | |
| JP | H05340846 A * | 12/1993 | ........... G01M 17/00 |
| JP | 06-028694 U | 4/1994 | |
| JP | 2001-091411 A | 4/2001 | |
| JP | 2009-300432 A | 12/2009 | |

OTHER PUBLICATIONS

Office Action dated Jun. 4, 2018 issued for Chinese Patent Application No. 201680801238.3, 14 pgs.
ESSR dated Sep. 14, 2018 issued for European Patent Application No. 16 761 464.3, 8 pgs.
Office Action dated Feb. 4, 2020 issued for Japanese Patent Application No. 2016-560931, 16 pgs.

\* cited by examiner

VEHICLE TEST DEVICE, VEHICLE TEST METHOD AND PROGRAM FOR VEHICLE TEST DEVICE

CROSS-REFERENCE TO RELATED APPLICATIONS

This application is the U.S. national phase of PCT Application No. PCT/JP2016/055060, filed on Feb. 22, 2016, which claims priority to JP Patent Application No. 2015-044809, filed on Mar. 6, 2015, the disclosures of which are incorporated in their entirety by reference herein.

FIELD OF THE ART

This invention relates to a vehicle test device, a vehicle test method and a program for vehicle test device.

BACKGROUND ART

As shown in the patent document 1, this kind of the vehicle test device comprises a rotating body on which a vehicle is placed and a control device that controls a motor connected with the rotating body, and tests performance of the vehicle or a part of the vehicle while rotating a wheel under the same condition as that of the actually running vehicle.

This vehicle test device is so configured to control the motor as considering rotational speed of the rotating body as the rotational speed of the wheel. Concretely the vehicle test device further comprises a speed detecting device that detects the rotational speed of the rotating body, and the control device controls torque applied to the rotational axis of the motor so as to make the rotational speed detected by the speed detecting device coincide with a target speed of the wheel.

For example, a case of testing the performance of the vehicle running at a ground speed of 100 km/h is considered. In this case, since there is a skid between a road surface and the wheel of the actually running vehicle, the wheel rotates at a rotation number corresponding to a speed (for example, the ground speed is 103 km/h) that is faster than the ground speed (100 km/h) of the vehicle. In other words, the ground speed of the vehicle differs from a vehicle speed calculated based on the rotation number of the wheel. Under this running condition, the control device controls the torque applied to the rotational axis of the motor to make the rotation number detected by the speed detecting device, namely the rotation number of the rotating body correspond to the ground speed of 103 km/h.

However, practically there is a skid between the rotating body and the wheel on the rotating body. As a result of this, in the above-mentioned case, the wheel on the rotating body fails to rotate at the same rotation number corresponding to the ground speed of 103 km/h, and rotates at the rotation number corresponding to, for example, the ground speed of 106 km/h. In case of decreasing the speed of the vehicle, a converse phenomenon is occurred. In other words, in accordance with above-mentioned arrangement, a gap generates between the rotating number of the actually running wheel and the wheel on the rotating body so that there is a problem that it becomes impossible to reproduce the actually running state accurately because of the gap.

PRIOR ART DOCUMENT

Patent Document

Patent document 1: Japanese Unexamined Patent Application Publication No. 2009-300432

DISCLOSURE OF THE INVENTION

Problems to be Solved by the Invention

The present claimed invention intends to solve all of the problems and a main object of this invention is to control the rotational speed of the wheel accurately so as to make it equal to the target value and to reproduce the actually running state with high accuracy.

Means to Solve the Problems

More specifically, the vehicle test device in accordance with this invention tests performance of a vehicle or a part of the vehicle by rotating a wheel placed on a rotating body, and is characterized by obtaining a rotation related value that indicates rotational speed of the wheel or torque applied to the wheel, and controlling the rotational speed of the rotating body or the torque applied to the rotating body so as to make the rotation related value equal to a predetermined target value.

In accordance with the vehicle test device having the above-mentioned arrangement, since the rotation related value of the wheel is obtained and the rotating body is controlled so as to make the rotation related value equal to the target value, unlike control by considering the rotational speed of the rotating body as the rotational speed of the wheel, no influence is exerted by the gap between the rotational speed of the rotating body and the rotational speed of the wheel.

With this arrangement, the rotation related value of the wheel can be controlled to be the target value accurately and the actual running can be reproduced with high accuracy. As a result of this, it is possible to accurately evaluate the performance of the vehicle or a part of the vehicle.

As a concrete embodiment to control the rotation related value of the wheel placed on the rotating body to be the rotation related value of the actually running wheel represented is that the predetermined target value is the rotational speed of the wheel or the torque applied to the wheel obtained at an actual running time, or the rotational speed of the wheel or the torque applied to the wheel calculated by the use of a running data obtained at the actual running time.

It is preferable to have a rotational speed detecting part that detects the rotational speed of the wheel in a state of being contact or contactless with the wheel.

In accordance with this arrangement, it is possible to directly detect the rotational speed of the wheel so that the rotational speed of the wheel can be controlled with high accuracy.

In order to make it possible to eliminate the need for the above-mentioned rotational speed detecting part, it is preferable to have a control device that calculates the rotational speed of the wheel based on a signal obtained through a network loaded on the vehicle and controls the rotational speed of the rotating body or the torque applied to the rotating body so as to make the rotational speed of the wheel equal to the predetermined target value.

As a concrete embodiment of the vehicle test device in accordance with this invention represented is that a chassis dynamometer is used, and the rotating body is a chassis roller.

Effect of the Invention

In accordance with this invention having the above-mentioned arrangement, it is possible to control the rotational speed of the wheel accurately to be the predetermined target value and to evaluate the performance of the vehicle or a part of the vehicle accurately by reproducing the actual running state accurately.

EXPLANATION OF CODES

100 . . . vehicle test device
V . . . vehicle
W . . . wheel
10 . . . chassis dynamometer
11 . . . roller
20 . . . control device
30 . . . rotational speed detecting part

BEST MODES OF EMBODYING THE INVENTION

One embodiment of a vehicle test device in accordance with this invention will be explained with reference drawings.

Figure 1:
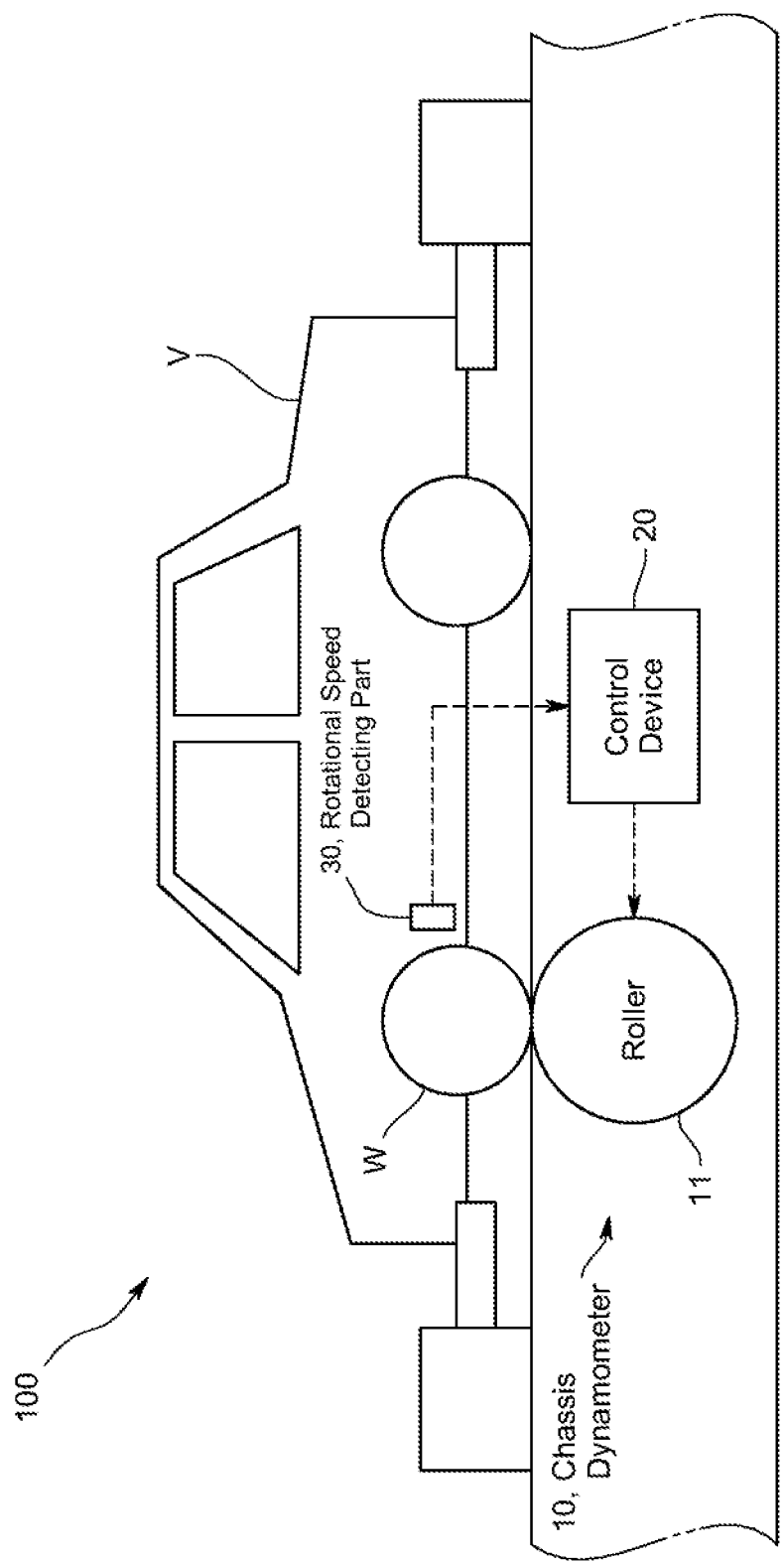
FIG. 1 is a pattern diagram showing a configuration of a vehicle test device in accordance with this embodiment.

The vehicle test device 100 in accordance with this embodiment tests performance of a vehicle (V) or a part of the vehicle (V) by pseudo running the vehicle (V) under a condition that is the same as an actual running condition (running on an actual road), and concretely as shown in FIG. 1, comprises a chassis dynamometer 10 on which the vehicle (V) is loaded and a control device 20 that controls the chassis dynamometer 10.

The chassis dynamometer 10 functions as a driving device that drives the vehicle (V) by working as an electric motor in accordance with a driving condition at the actual running time, and also functions as a loading device that imparts a load to the vehicle (V) by working as a generator.

Concretely, the chassis dynamometer 10 has a chassis roller 11 (hereinafter also called as a roller 11) as being a rotating body on which a driving wheel (W) (hereinafter also called just as a wheel (W)) such as a front wheel is placed and a motor, not shown in drawings, that is connected with the roller 11 and that rotates the roller 11.

The roller 11 is, for example, a rotational drum or an endless belt (a flat belt).

The control device 20 comprises a CPU, a memory, an A/D converter, a D/A converter or the like, and controls rotational speed of the roller 11 by cooperating the CPU and its peripheral devices based on programs stored in a predetermined area of the memory. The control device 20 controls the rotational speed of the roller 11 by controlling an output of the motor.

The control device 20 in accordance with this embodiment obtains a rotation related value indicating rotational speed of the wheel (W) or a torque that is applied to the wheel (W), and controls the rotational speed of the roller 11 so as to make the rotation related value equal to a predetermined target value that is stored in the memory.

The target value is the rotational speed of the wheel (W) at the actual running time, and is, for example, a value calculated by the use of a vehicle speed obtained by the actual naming or a naming data such as a road surface state, an over-time value based on a running pattern previously obtained by the actual miming, or a value based on a miming pattern input by an operator by means of an input interface.

In this embodiment, as shown in FIG. 1, the vehicle test device 100 further comprises a rotational speed detecting part 30 that detects the rotational speed of the wheel (W), and the control device 20 obtains the rotational speed of the wheel (W) detected by the rotational speed detecting part 30 as the rotation related value.

More specifically, the control device 20 controls the chassis dynamometer 10 so as to make the rotational speed of the wheel (W) equal to the rotational speed of the wheel at the actual running time. In this embodiment, the rotational speed of the wheel obtained by the actual running or the rotational speed or the rotational speed of the wheel (W) calculated by the use of the running data obtained by the actual running is stored in the memory as the target value, and the control device 20 performs a feedback control on the rotational speed of a surface of the roller 11 by controlling the output of the motor so as to make the rotational speed obtained by the rotational speed detecting part 30 coincide with the above-mentioned target value.

The rotational speed detecting part 30 directly detects the rotational speed of the wheel (W) in a state of being contact or contactless with the wheel (W), and uses, for example, a proximity sensor, a photoelectric sensor, a magnetic sensor, a rotary encoder or the like.

More concretely, the rotational speed detecting part 30 detects the rotational speed of the wheel (W) based on a number of a pulse signal per unit time generated in accordance with the rotation of the wheel (W), and outputs a rotational speed signal indicating the rotational speed to the above-mentioned control device 20.

In accordance with the vehicle test device 100 having the above-mentioned arrangement, since the rotational speed of the wheel (W) is detected and the rotational speed of the roller 11 is controlled so as to make the detected rotational speed of the wheel (W) equal to the rotational speed of the wheel (W) at the actual running time, it is possible to control the running speed of the wheel (W) without being influenced by a gap of the running speed between the wheel (W) and the roller 11.

As a result of this, it is possible to make the rotational speed of the wheel (W) coincide with the rotational speed that corresponds to the running speed of the vehicle (V) at the actual running time, namely the rotational speed of the wheel (W) at the actual running time so that it is possible to reproduce the actual running with high accuracy and to evaluate the performance of the vehicle (V) or of a part of the vehicle (V) accurately.

In addition, since the rotational speed of the wheel (W) can be controlled without being influenced by the gap of the rotational speed between the wheel (W) and the roller 11, there is no need of controlling the wheel (W) by the use of a slip ratio between the wheel (W) and the roller 11 so that the program can be simplified.

Furthermore, since the rotational speed of the wheel (W) is detected by the rotational speed detecting part 30, it is possible to control the rotational speed of the wheel (W) with high accuracy.

The present claimed invention is not limited to the above-mentioned embodiment.

Figure 2:
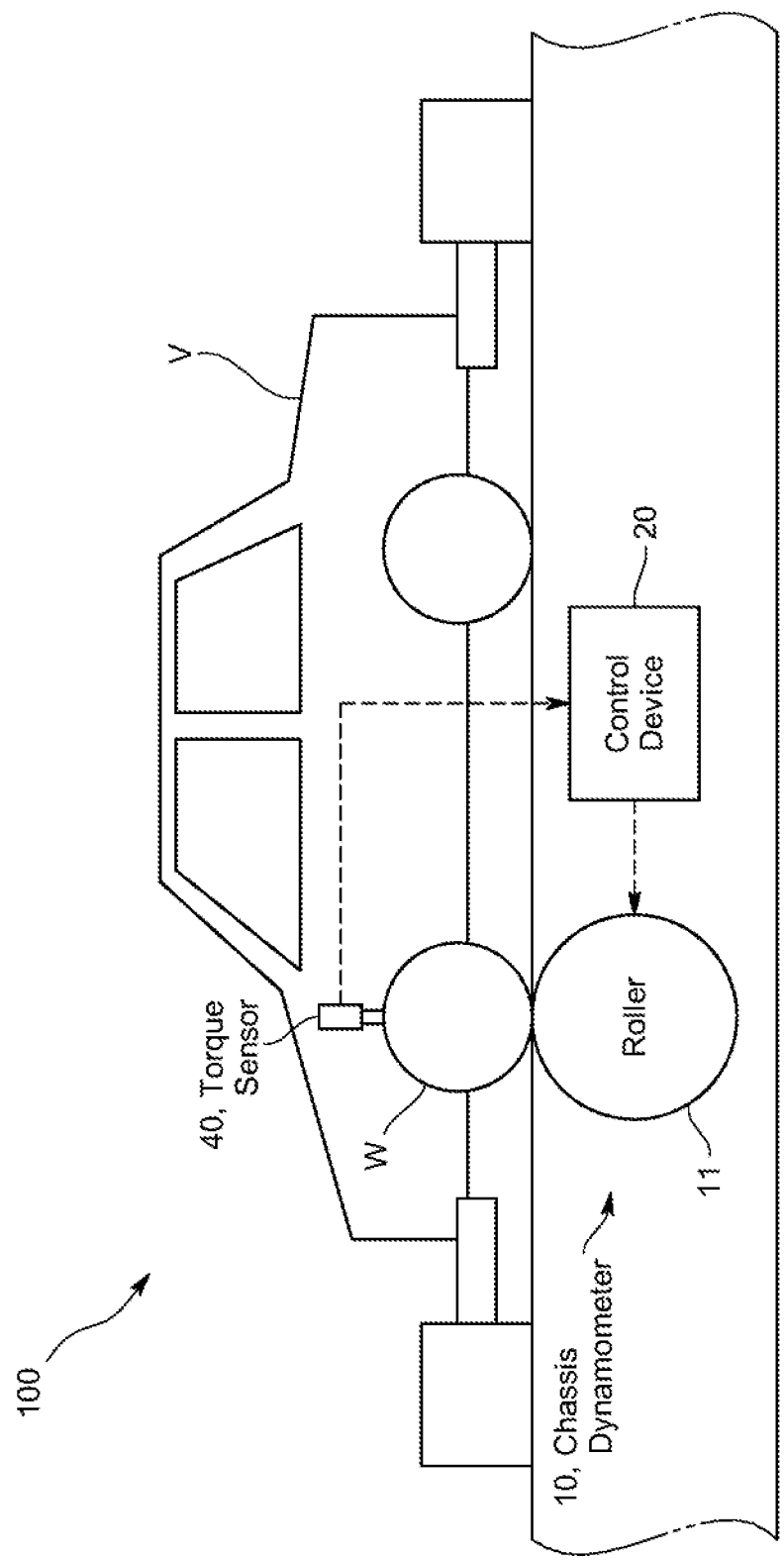
FIG. 2 is a pattern diagram showing a configuration of a vehicle test device in accordance with another embodiment.

For example, the control device 20 obtains the rotational speed of the wheel (W) detected by the rotational speed detecting part 30 and controls the rotational speed of the roller 11 so as to make the rotational speed of the wheel (W) equal to the target value in the above-mentioned embodiment, however, as shown in FIG. 2, a torque detected by a torque sensor 40 arranged for an axle of the wheel (W) may be obtained and control the rotational speed of the roller 11 so as to make the torque equal to the target value.

Figure 3:
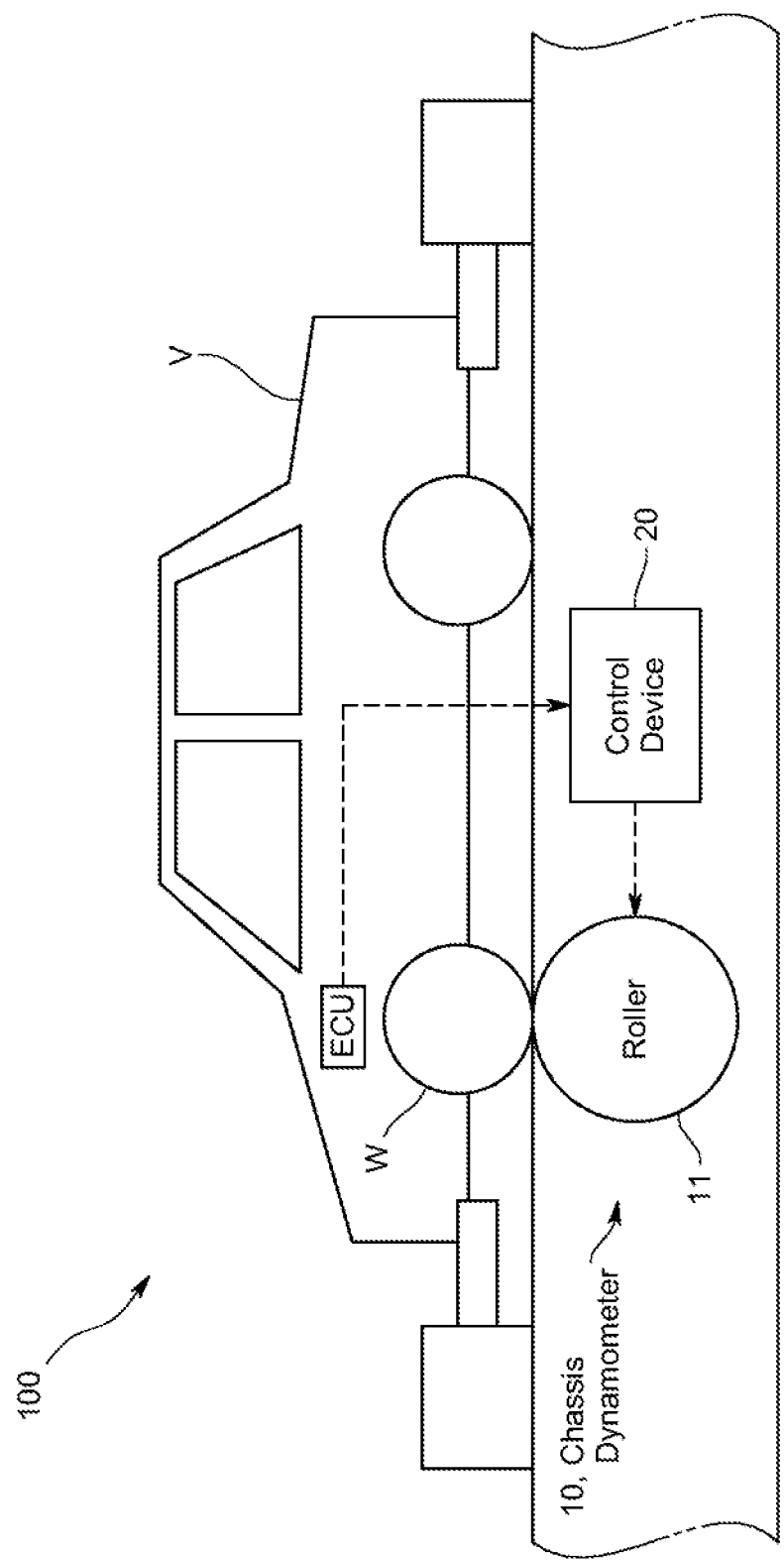
FIG. 3 is a pattern diagram showing a configuration of a vehicle test device in accordance with another embodiment.

Furthermore, as shown in FIG. 3, the control device 20 may calculate the rotational speed of the wheel (W) based on a signal obtained through an onboard network such as a control area network (CAN) or the like from an electronic control unit (ECU) and control the rotational speed of the roller 11 so as to make the rotational speed of the wheel (W) equal to the target value.

It is a matter of course that the control unit 20 may obtain a signal indicating the rotational speed of the wheel (W) through the onboard network from the ECU and control the rotational speed of the roller 11 so as to make the rotational speed of the wheel (W) equal to the target value.

Figure 4:
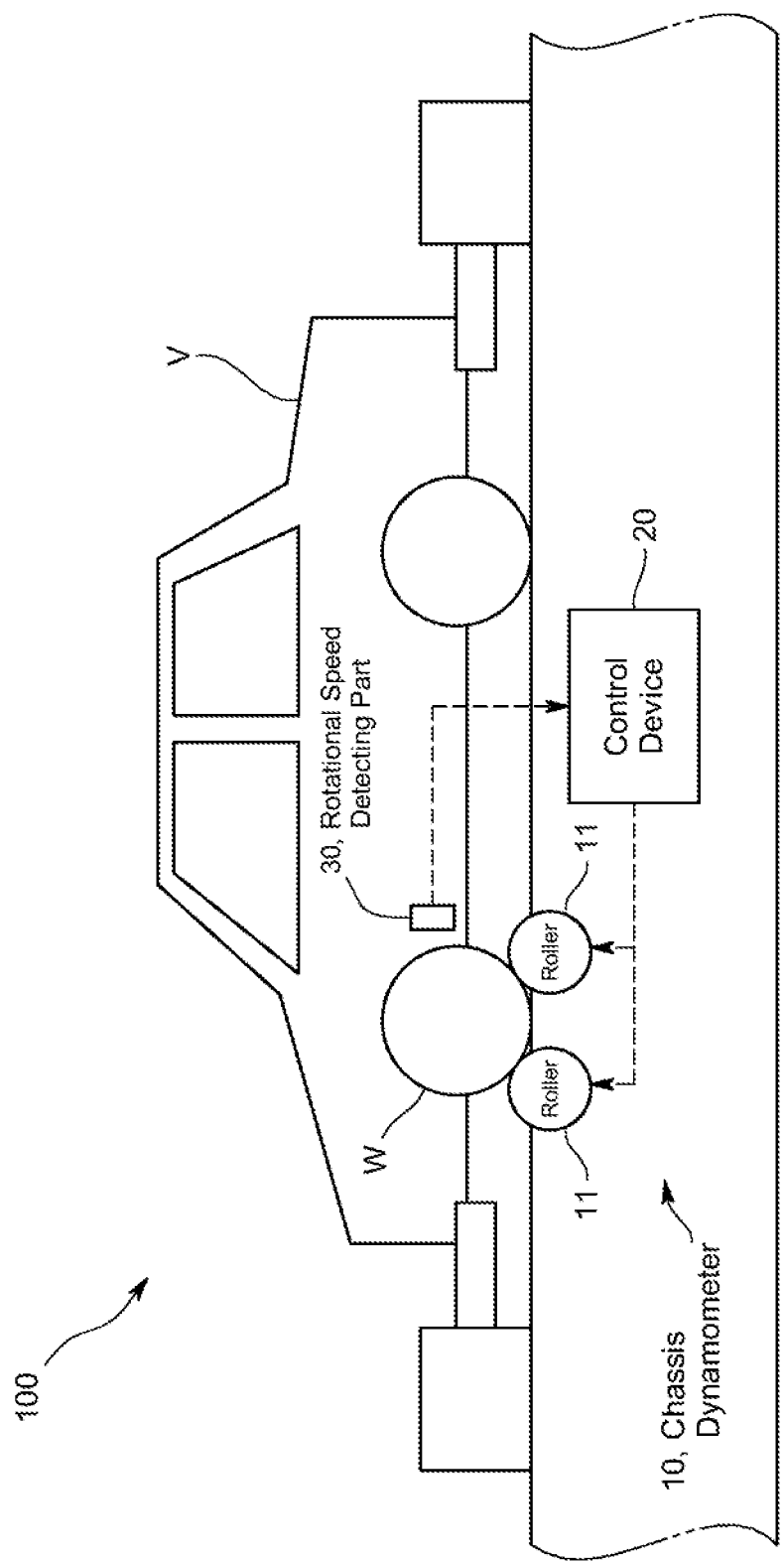
FIG. 4 is a pattern diagram showing a configuration of a vehicle test device in accordance with another embodiment.

In addition, as shown in FIG. 4, the chassis dynamometer 10 may be so configured that the wheel (W) is loaded on two rollers 11. In this case, the controller 20 may control both rollers 11, or may control either one of the rollers 11. Furthermore, the vehicle test device is not necessarily to test a finished vehicle, and may test a wheel mounted on an engine or a power train.

In addition, the control device of the above-mentioned embodiment controls the rotational speed of the roller by controlling the output of the motor, however, the rotational speed of the roller may be controlled by controlling torque applied to the rotation axis of the motor.

Furthermore, in addition to the chassis dynamometer of the above-mentioned embodiment, in order to make it possible to correspond to 4WD, the chassis dynamometer may be a chassis dynamometer comprising a pair of rollers arranged in the front and in the rear. In addition, a pair of rollers each of which corresponds to each of the right and left wheels may be provided.

In this case, it is represented that the vehicle test device obtains the rotational speed of each of the wheels locating on each roller respectively, and controls the rotational speed of each wheel so as to make each rotational speed equal to the target value respectively.

In addition, the control device of the above-mentioned embodiment is so configured to control the chassis dynamometer to make the rotational speed of the wheel on the roller equal to the rotational speed of the wheel at the actual running time, however, an actual speed as being an actual speed (a ground speed) of the vehicle at the actual running time may be obtained and the chassis dynamometer may be controlled so as to make a surface speed of the roller equal to the above-mentioned actual speed.

Furthermore, the vehicle test device in accordance with this invention may be used together with an exhaust gas analyzer.

In accordance with this arrangement, it is possible to analyze an exhaust gas in a state of imitating the actual running with high accuracy by the vehicle test device and to highly approximate a measurement result of the exhaust gas discharged from the vehicle on the roller to a measurement result of the exhaust gas actually discharged from the actually running vehicle.

It is a matter of course that the present claimed invention is not limited to the above-mentioned embodiment and may be variously modified without departing from a spirit of the invention.

Figure 5:
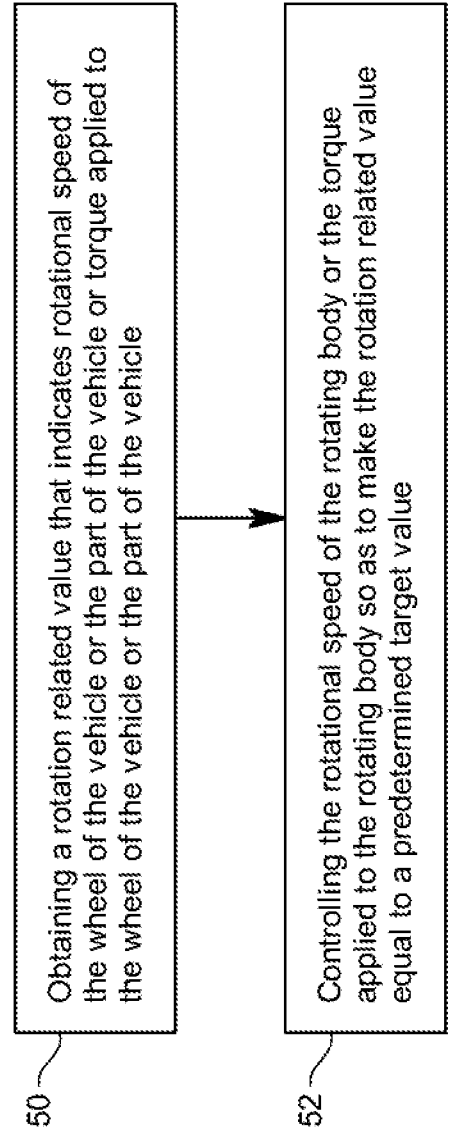
FIG. 5 is a flow chart for a vehicle test method that tests performance of a vehicle or a part of a vehicle by rotating a wheel placed on a rotating body.

Referring to FIG. 5, a rotation related value that indicates rotational speed of the wheel of the vehicle or the part of the vehicle or torque applied to the Wheel of the vehicle or the part of the vehicle is obtained at operation 50. The rotational speed of the rotating body or the torque applied to the rotating body is controlled so as to make the rotation related value equal to a predetermined target value at operation 52.

Possible Applications in Industry

In accordance with the above-mentioned invention, the rotational speed of the vehicle can be controlled accurately to the predetermined target value so that it is possible to evaluate the performance of the vehicle or the performance of a part of the vehicle with high accuracy by reproducing the actual running state.

The invention claimed is:

1. A system that tests performance of a vehicle or a part of a vehicle by rotating a wheel placed on a rotating body, comprising:
    (I) a rotational speed detecting part that uses a sensor configured to detect actual rotational speed of the wheel in a state of being contact or contaetless with the wheel, wherein the actual rotational speed of the wheel is not equal to a rotational speed of the rotating body or (II) a torque sensor configured to detect actual torque applied to the wheel, wherein the actual torque applied to the wheel is not equal to torque applied to the rotating body; and
    a controller configured to
        obtain (i) the detected actual rotational speed of the wheel from the rotational speed detecting part or from a signal of a network loaded on the vehicle, or (ii) the detected actual torque applied to the wheel of the vehicle or the part of the vehicle from the torque sensor, and
        feedback control the rotational speed of the rotating body or the torque applied to the rotating body to make the detected actual rotational speed or the detected actual torque of the wheel equal to a predetermined target value.

2. The system described in claim 1, wherein the predetermined target value is a rotational speed of the wheel or a torque applied to the wheel obtained at a running time, or a rotational speed of the wheel or a torque applied to the wheel calculated by use of running data obtained at the running time.

3. The system described in claim 1 further comprising a chassis dynamometer, wherein the rotating body is a chassis roller of the chassis dynamometer.

4. A vehicle test method that tests performance of a vehicle or a part of a vehicle by rotating a wheel placed on a rotating body, comprising:
    detecting (i) from a sensor of a rotational speed detecting part, actual rotational speed of the wheel in a state of being contact or contactless with the wheel or from a signal of a network loaded on the vehicle, wherein the actual rotational speed of the wheel is not equal to a rotational speed of the rotating body or (ii) from a torque sensor actual torque applied to the wheel, wherein the actual torque applied to the wheel is not equal to torque applied is i the rotating body; and feedback controlling the rotational speed of the rotating body or the torque applied to the rotating body to make the actual rotational speed or the actual torque oithe wheel equal to a predetermined target value.

5. A non-transitory computer readable medium comprising a plurality of instructions that, in response to being executed on a system, cause the system to test performance of a vehicle or a part of a vehicle by rotating a Wheel placed on a rotating body, detecting (i) from a sensor of a rotational speed detecting part, actual rotational speed of the wheel in a state of being contact or contactless with the wheel or from a signal of a network loaded on the vehicle, wherein the actual rotational speed of the wheel is not equal to a rotational speed of the rotating body or (ii) from a torque sensor actual torque applied to the wheel, wherein the actual torque applied to the wheel is not equal to torque applied to the rotating body; and feedback controlling the rotational speed of the rotating body or the torque applied to the rotating body to make the actual rotational speed or the actual torque oithe wheel equal to a predetermined target value.

6. The system described in claim 1, wherein the sensor is a proximity sensor, a photoelectric sensor, a magnetic sensor, or a rotary encoder.

* * * * *